US012616934B2

(12) United States Patent
Mukhopadhyay et al.

(10) Patent No.: US 12,616,934 B2
(45) Date of Patent: *May 5, 2026

(54) FULLY AUTOMATED DIRECT AIR CAPTURE CARBON DIOXIDE PROCESSING SYSTEM

(71) Applicant: AirMyne, Inc., Berkeley, CA (US)

(72) Inventors: Sudip Mukhopadhyay, Berkeley, CA (US); Mark Patrick Cyffka, El Cerrito, CA (US)

(73) Assignee: AirMyne, Inc., Berkeley, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 18/670,072

(22) Filed: May 21, 2024

(65) Prior Publication Data

US 2024/0299877 A1     Sep. 12, 2024

Related U.S. Application Data

(63) Continuation of application No. 18/117,633, filed on Mar. 6, 2023, which is a continuation of application
(Continued)

(51) Int. Cl.
*B01D 53/14* (2006.01)
*B01D 53/00* (2006.01)
(Continued)

(52) U.S. Cl.
CPC ....... *B01D 53/1425* (2013.01); *B01D 53/005* (2013.01); *B01D 53/1475* (2013.01);
(Continued)

(58) Field of Classification Search
None
See application file for complete search history.

(56) References Cited

U.S. PATENT DOCUMENTS 4,012,206 A     3/1977  Macriss et al.
5,215,498 A     6/1993  Wong et al.
(Continued)

FOREIGN PATENT DOCUMENTS

CN          105966225       9/2016
CN          107101407       8/2017
(Continued)

OTHER PUBLICATIONS

USPTO, Non-Final Office Action issued in U.S. Appl. No. 18/117,633 on Aug. 6, 2025, 37 pages.
(Continued)

*Primary Examiner* — John J Figueroa
(74) *Attorney, Agent, or Firm* — Henry Patent Law Firm PLLC

(57) ABSTRACT

A carbon processing system comprises an air mover and a multi-stage reactor. The multi-stage reactor processes ambient air and generates carbon dioxide and generates exhausted gas released to ambient air. In operation, air contacts the base solution via the air mover. The air reacts with the base solution thereby generating a base solution having carbon dioxide and generating exhaust (absorption reaction). Next, the exhaust is released from the reactor. Next, heat is applied to the base solution having carbon dioxide thereby generating carbon dioxide and generating a base solution without carbon dioxide (desorption reaction). The base solution without carbon dioxide generated after applying heat is reusable in processing new air. The absorption reaction and desorption reaction are reversible reactions resulting in regeneration of the base solution into its form prior to contact with the air yielding high scalability and less processing volume as required by many conventional carbon processing techniques.

18 Claims, 6 Drawing Sheets

Related U.S. Application Data

No. 17/948,492, filed on Sep. 20, 2022, now Pat. No. 11,612,853.

(60) Provisional application No. 63/295,942, filed on Jan. 2, 2022.

(51) Int. Cl.

| | |
|---|---|
| B01D 53/75 | (2006.01) |
| B01D 53/78 | (2006.01) |

(52) U.S. Cl.

CPC ............. B01D 53/75 (2013.01); B01D 53/78 (2013.01); *B01D 2221/16* (2013.01); *B01D 2252/103* (2013.01); *B01D 2257/504* (2013.01); *B01D 2259/40088* (2013.01)

(56) References Cited

U.S. PATENT DOCUMENTS

| | | | | |
|---|---|---|---|---|
| 5,221,520 | A | 6/1993 | Cornwell | |
| 9,205,375 | B2 | 12/2015 | Jones et al. | |
| 11,612,853 | B1* | 3/2023 | Mukhopadhyay | B01D 53/78 |
| | | | | 423/220 |
| 11,801,476 | B2* | 10/2023 | Scherpbier | B01D 53/1475 |
| 11,906,227 | B2 | 2/2024 | Legg et al. | |
| 12,005,390 | B1* | 6/2024 | Scherpbier | B01D 53/1425 |
| 2007/0271943 | A1 | 11/2007 | Baruschuke et al. | |
| 2008/0295580 | A1 | 12/2008 | Minor | |
| 2009/0120288 | A1 | 5/2009 | Lackner et al. | |
| 2013/0230442 | A1 | 9/2013 | Wei et al. | |
| 2013/0340616 | A1* | 12/2013 | Lyer | C10L 3/101 |
| | | | | 95/186 |
| 2014/0123850 | A1* | 5/2014 | Bedell | B01D 53/62 |
| | | | | 95/148 |
| 2014/0251136 | A1* | 9/2014 | Park | B01D 53/0462 |
| | | | | 96/126 |
| 2015/0197425 | A1* | 7/2015 | Hayashi | B01D 53/1493 |
| | | | | 422/173 |
| 2015/0258488 | A1 | 9/2015 | Meirav et al. | |
| 2016/0016108 | A1* | 1/2016 | Park | B01D 53/12 |
| | | | | 95/148 |
| 2016/0262987 | A1 | 9/2016 | Bublewitz | |
| 2017/0252693 | A1 | 9/2017 | Kuroda et al. | |
| 2017/0256812 | A1 | 9/2017 | Yoon et al. | |
| 2017/0354925 | A1 | 12/2017 | Heidel et al. | |
| 2018/0117530 | A1* | 5/2018 | Pleißner | B01D 53/261 |
| 2018/0214822 | A1* | 8/2018 | Eisenberger | B01J 20/262 |
| 2019/0039047 | A1 | 2/2019 | Kimura et al. | |
| 2019/0161659 | A1 | 5/2019 | Kujak et al. | |
| 2019/0193019 | A1 | 6/2019 | Okano | |
| 2020/0114306 | A1 | 4/2020 | Miyamoto et al. | |
| 2020/0129916 | A1 | 4/2020 | Constantz | |
| 2020/0206675 | A1 | 7/2020 | Kim et al. | |
| 2020/0346165 | A1 | 11/2020 | Lu | |
| 2020/0353798 | A1 | 11/2020 | Kim | |
| 2021/0120750 | A1 | 4/2021 | Bourhis | |
| 2021/0129072 | A1 | 5/2021 | Deng | |
| 2021/0245092 | A1 | 8/2021 | Liu | |
| 2021/0300765 | A1 | 9/2021 | Gilroysmith | |
| 2022/0088613 | A1 | 3/2022 | Hopkins | |
| 2022/0136119 | A1 | 5/2022 | Flanders | |
| 2022/0176312 | A1 | 6/2022 | Olmstead et al. | |
| 2022/0193606 | A1 | 6/2022 | Nold et al. | |
| 2022/0355832 | A1 | 11/2022 | Bachman | |
| 2024/0024822 | A1* | 1/2024 | Merrill | B01D 61/38 |
| 2024/0328681 | A1 | 10/2024 | Legg et al. | |
| 2025/0153096 | A1* | 5/2025 | Scherpbier | B01D 53/1406 |

FOREIGN PATENT DOCUMENTS

| | | |
|---|---|---|
| CN | 108458512 | 8/2018 |
| CN | 108458521 | 8/2018 |
| CN | 110796581 | 2/2020 |
| CN | 110849073 | 2/2020 |
| CN | 112126477 | 12/2020 |
| CN | 213984106 | 8/2021 |
| CN | 113401903 | 9/2021 |
| CN | 113405164 | 9/2021 |
| CN | 114777277 | 7/2022 |
| EP | 3842700 | 6/2021 |
| GB | 2592707 | 8/2021 |
| JP | H07253254 | 10/1995 |
| JP | 2002316809 | 10/2002 |
| JP | 2006266523 | 10/2006 |
| JP | 2020094761 | 6/2020 |
| JP | 2022539406 | 9/2022 |
| KR | 20060064344 | 6/2006 |
| KR | 101811957 | 12/2017 |
| KR | 20220068445 | 5/2022 |
| WO | 2005108297 | 11/2005 |
| WO | 2011137398 | 11/2011 |
| WO | 2011151549 | 12/2011 |
| WO | 2019161114 | 8/2019 |
| WO | 2021150722 | 7/2021 |
| WO | 2021181483 | 9/2021 |
| WO | 2021189042 | 9/2021 |
| WO | 2021230045 | 11/2021 |
| WO | 2022219114 | 10/2022 |
| WO | 2023130147 | 7/2023 |

OTHER PUBLICATIONS

JPO, Office Action issued in Application No. 2023-209994 on Jun. 18, 2024, 13 pages.

JPO, Notice of Allowance issued in Application No. 2023-209994 on Nov. 29, 2024, 4 pages.

USPTO, Non-Final Office Action issued in U.S. Appl. No. 18/101,068 on Jul. 14, 2025, 42 pages.

USPTO, Non-Final Office Action issued in U.S. Appl. No. 18/440,373 on Jul. 9, 2025, 34 pages.

USPTO, Non-Final Office Action issued in U.S. Appl. No. 18/101,068 on Dec. 5, 2025, 26 pages.

USPTO, Non-Final Office Action issued in U.S. Appl. No. 18/440,373 on Dec. 5, 2025, 30 pages.

USPTO, Notice of Allowance issued in U.S. Appl. No. 18/117,633 on Dec. 10, 2025, 10 pages.

* cited by examiner

CARBON
PROCESSING
SYSTEM
10

EXHAUST AIR
($CO_2$ STRIPPED AIR)
(FIRST STAGE)
16

REACTOR
(TWO STAGES)
12

18
CARBON
DIOXIDE
(SECOND
STAGE)

BASE SOLUTION
$a[Q^+]b[X^-] + H_2O$
13

AIR
MOVER
11

AIR
(<800PPM $CO_2$)

14
AIR TO CONTACT
BASE SOLUTION
IN REACTOR
(FIRST STAGE)

HEAT
(SECOND STAGE)
17

CARBON PROCESSING SYSTEM

REACTION DURING FIRST STAGE OF REACTOR
(ABSORPTION REACTION)

REACTION IN SECOND STAGE OF REACTOR
(DESORPTION REACTION)

CARBON PROCESSING SYSTEM
(ANOTHER EMBODIMENT)

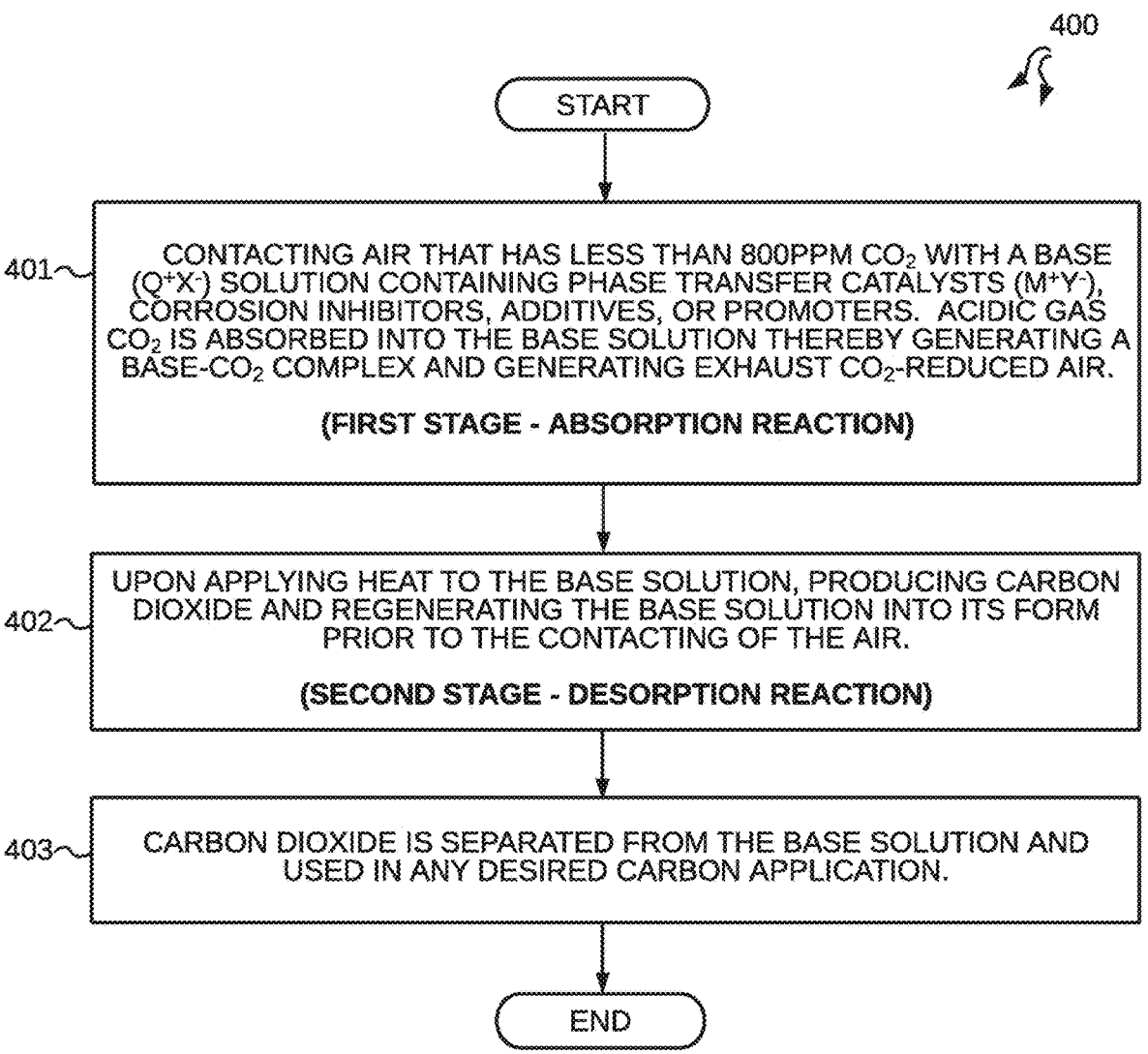

400

START

401 — CONTACTING AIR THAT HAS LESS THAN 800PPM $CO_2$ WITH A BASE ($Q^+X^-$) SOLUTION CONTAINING PHASE TRANSFER CATALYSTS ($M^+Y^-$), CORROSION INHIBITORS, ADDITIVES, OR PROMOTERS. ACIDIC GAS $CO_2$ IS ABSORBED INTO THE BASE SOLUTION THEREBY GENERATING A BASE-$CO_2$ COMPLEX AND GENERATING EXHAUST $CO_2$-REDUCED AIR.

(FIRST STAGE - ABSORPTION REACTION)

402 — UPON APPLYING HEAT TO THE BASE SOLUTION, PRODUCING CARBON DIOXIDE AND REGENERATING THE BASE SOLUTION INTO ITS FORM PRIOR TO THE CONTACTING OF THE AIR.

(SECOND STAGE - DESORPTION REACTION)

403 — CARBON DIOXIDE IS SEPARATED FROM THE BASE SOLUTION AND USED IN ANY DESIRED CARBON APPLICATION.

END

FIG. 7

FULLY AUTOMATED DIRECT AIR CAPTURE CARBON DIOXIDE PROCESSING SYSTEM

CROSS REFERENCE TO RELATED APPLICATIONS

This application is a continuation of U.S. patent application Ser. No. 18/117,633, entitled "Fully Automated Direct Air Capture Carbon Dioxide Processing System," filed on Mar. 6, 2023, which is a continuation of U.S. patent application Ser. No. 17/948,492, entitled "Fully Automated Direct Air Capture Carbon Dioxide Processing System," filed on Sep. 20, 2022, which is now U.S. Pat. No. 11,612,853, which claims the benefit under 35 U.S.C. § 119 from U.S. Provisional Patent Application Ser. No. 63/295,942, entitled "Fully Automated Direct Air Capture Carbon Dioxide Processing System," filed on Jan. 2, 2022, the subject matters of which are incorporated herein by reference.

TECHNICAL FIELD

The present invention relates generally to carbon processing, and more specifically, to scalable carbon processing systems.

BACKGROUND INFORMATION

In chemical manufacturing plants and downstream refinery processes, acidic gases, including $H_2S$, are quite often removed from a mixture of flue gases with five- to 35-percent concentration using liquid amine absorption towers. Amines react with acidic gases to form a complex, which can be reversibly broken into starting amine and acidic gas at elevated temperatures. Similar amine-based processes are commonly used for the removal of other acid gases, such as nitrogen oxides ($NO_x$), sulfur oxides ($SO_x$), and carbon dioxide ($CO_2$) with higher concentrations of industrial flue gases in manufacturing plants. Other chemical processes based on solid adsorbents, zeolites, and metal-organic frameworks (MOFs) are also commonly used for removing acidic flue gases with higher concentration in large-scale setups.

SUMMARY

A carbon processing system comprises an air mover and a multi-stage reactor. The multi-stage reactor processes ambient air and generates carbon dioxide, as well as exhausted gas. The exhausted gas is released to ambient air. The carbon dioxide that is generated is usable in injection, sequestration, or in production of commodity carbon dioxide-derived materials, such as dry ice. The generated carbon dioxide is also usable in mobile refrigerants, industrial refrigerants, feedstock or starting material for the manufacture of useful chemicals including urea, methanol, formaldehyde, esters, ethers, hydrocarbons, polymers, plastics, and carbon monoxide. The carbon processing system uses a base solution that is regenerated during the novel process and reused during each carbon processing cycle. This provides for significant automation capabilities and scalability of the carbon processing system.

In one embodiment, the carbon processing system employs direct air-capture techniques. For example, the carbon processing system uses an air mover to provide air to the system for processing. The air mover comprises at least one of a compressor, a blower, a fan, a turbofan, a pump, a diaphragm pump, a Heating, Ventilation, and Air Conditioning (HVAC) system, an air contactor, a cooling tower, a falling-film evaporator, or an absorber. The multi-stage reactor involves a single container or two or more containers that provide the multi-stage functionality.

The multi-stage reactor includes a base solution. The base solution is water ($H_2O$) containing a dissolved salt of the form a[$Q^+$]b[$X^-$]. The symbol "Q" in this general equation is the cation species, and in one example, is a quaternary ammonium cation taken from the group consisting of $NH_4^+$, $N(CH_3)_4^+$, $N(ethyl)_4^+$, $N(Butyl)_4^+$, and $N(Propyl)_4^+$, or is a cation taken from the group consisting of $K^+$, $Na^+$, $Ca^{2+}$, and $Mg^{2+}$. The symbol "X" in this general equation is the anion species, and in one example, is taken from the group consisting of $OH^-$, $O_2^-$, $CO_3^{2-}$, $HCO_3^-$, $Cl^-$, $Br^-$, and $I^-$. The symbols "a" and "b" in this general equation are integers such that the total charge of the water containing the dissolved salt is neutral.

In other embodiments, the base solution includes corrosion inhibitors, additives, or promoters. The corrosion inhibitors include vanadium pentoxide or other metallic oxides, and the additives or promoters include MEA (monoethanolamine), DEA (diethanolamine), TEA (triethanolamine), MDEA (methyl diethanolamine), piperazine, glycine, or any material that lowers an activation energy. In yet another embodiment, the base solution includes a phase transfer catalyst or agent with the structure of the form c[$M^+$]d[$Y^-$] that reduces interfacial surface tension and promotes mixing in gas-liquid or gas-liquid-solid systems. The symbol "M" in this general equation is the cation species. The symbol "Y" in this general equation is the anion species. The symbols "c" and "d" in this general equation are integers such that the total charge is neutral.

In operation, air contacts the base solution via the air mover. The air reacts with the base solution thereby generating a base solution having carbon dioxide and generating exhaust. This first stage is an absorption reaction. Next, the exhaust is released from the reactor. Released exhaust has less carbon dioxide than the air that contacts the base solution.

Next, heat is applied to the base solution having carbon dioxide thereby generating carbon dioxide and generating a base solution without carbon dioxide. This second stage is a desorption reaction. The base solution without carbon dioxide generated after applying heat is reusable in processing new air. The absorption reaction and desorption reaction are reversible reactions resulting in regeneration of the base solution into its form prior to contact with the air. The carbon processing system is highly scalable and consumes less processing volume than is required by many conventional carbon processing techniques.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 7 is a flowchart of a method 400 in accordance with another embodiment.

DETAILED DESCRIPTION

Reference will now be made in detail to some embodiments of the invention, examples of which are illustrated in the accompanying drawings.

Figure 1:
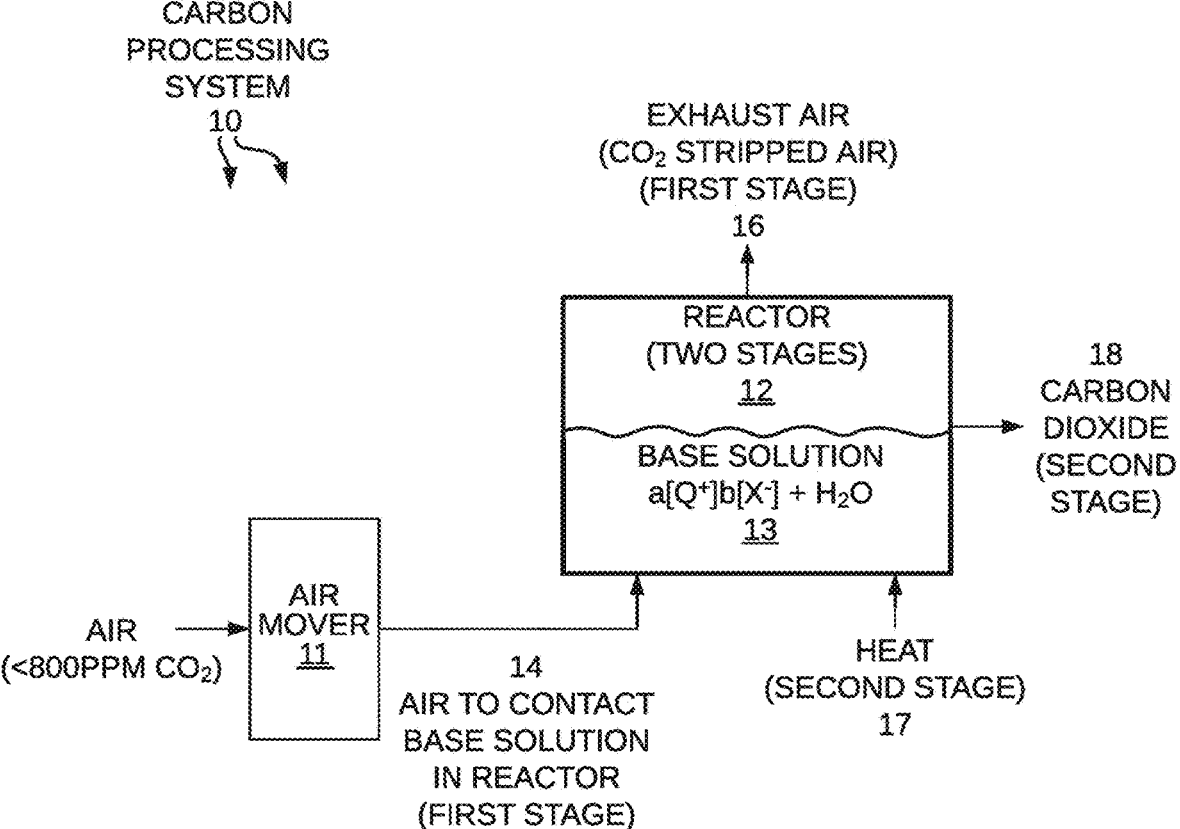
FIG. 1 is a diagram of a carbon processing system 10.

FIG. 1 is a diagram of a carbon processing system 10. The carbon processing system 10 comprises an air mover 11 and a multi-stage reactor 12. In various embodiments, the air mover 11 comprises at least one of a compressor, a blower, a fan, a turbofan, a pump, a diaphragm pump, a Heating, Ventilation, and Air Conditioning (HVAC) system, an air contactor, a cooling tower, a falling-film evaporator, or an absorber. The multi-stage reactor 12 involves a single container or two or more containers that provide the multi-stage functionality.

The multi-stage reactor 12 includes a base solution 13. The base solution is water ($H_2O$) containing a dissolved salt of the form $a[Q^+]b[X^-]$. The symbol "Q" in this general equation is the cation species, and in one example, is a quaternary ammonium cation taken from the group consisting of $NH_4^+$, $N(CH_3)_4^+$, $N(ethyl)_4^+$, $N(Butyl)_4^+$, and $N(Propyl)_4^+$, or is a cation taken from the group consisting of $K^+$, $Na^+$, $Ca^{2+}$, and $Mg^{2+}$. The symbol "X" in this general equation is the anion species, and in one example, is taken from the group consisting of $OH^-$, $O_2^-$, $CO_3^{2-}$, $HCO_3^-$, $Cl^-$, $Br^-$, and $I^-$. The symbols "a" and "b" in this general equation are integers such that the total charge of the water containing the dissolved salt is neutral.

In another embodiment, the base solution 13 includes corrosion inhibitors, additives, or promoters. The corrosion inhibitors include vanadium pentoxide or other metallic oxides, and the additives or promoters include MEA (monoethanolamine), DEA (diethanolamine), TEA (triethanolamine), MDEA (methyl diethanolamine), piperazine, glycine, or any material that lowers an activation energy. In another embodiment, the base solution 13 includes a phase transfer catalyst or agent with the structure of the form $c[M^+]d[Y^-]$ that reduces interfacial surface tension and promotes mixing in gas-liquid or gas-liquid-solid systems. The symbol "M" in this general equation is the cation species. The symbol "Y" in this general equation is the anion species. The symbols "c" and "d" in this general equation are integers such that the total charge is neutral.

In operation, air 14 contacts the base solution 13 via the air mover 11. The air 14 reacts with the base solution 13 thereby generating a base solution having carbon dioxide 15 (see FIG. 3) and generating exhaust 16. This first stage is an absorption reaction. The air 14 that contacts the base solution has less than five percent carbon dioxide by weight. The air 14 that contacts the base solution is not a flue gas. The air that contacts the base solution has a pressure between 0.1 and 10000 psig.

Next, the exhaust 16 is released from the reactor 12. The exhaust 16 released has less carbon dioxide than the air that contacts the base solution. The exhaust 16 is carbon dioxide stripped air.

Next, heat 17 is applied to the base solution having carbon dioxide 15 thereby generating carbon dioxide 18 and generating a base solution without carbon dioxide 13. This second stage is a desorption reaction. Heat 17 increases a temperature of the base solution having carbon dioxide 15 to less than 200 degrees Celsius. In one embodiment, the temperature of the base solution having carbon dioxide 15 is increased to at least 120° C. The base solution without carbon dioxide 13 generated after applying heat 17 is reusable in processing new air 14.

In accordance with at least one novel aspect, the absorption reaction and desorption reaction are reversible reactions resulting in regeneration of the base solution 13 into its form prior to contact with the air. By employing this novel technique, the carbon processing system 10 is highly scalable and consumes less processing volume than is required by many conventional carbon processing techniques.

Figure 2:
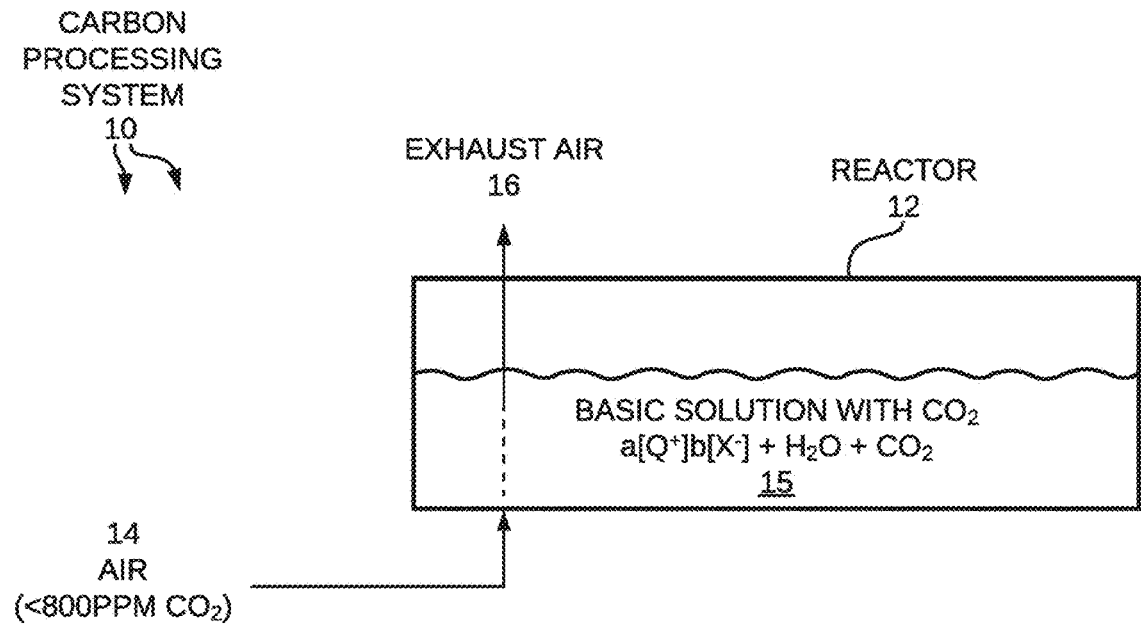
FIG. 2 is a diagram showing the first stage of the multi-stage reactor 12 of the carbon processing system 10.

FIG. 2 is a diagram showing the first stage of the multi-stage reactor 12 of the carbon processing system 10. In the first stage, an absorption reaction is performed in which air 14 contacts the base solution 13 (as shown in FIG. 1) generating a base solution with carbon dioxide 15 and exhaust 16. The exhaust 16 is released from the reactor 12. The exhaust 16 is carbon-stripped air. After releasing exhaust 16, the reactor 12 only contains the base solution with carbon dioxide 15.

Figure 3:
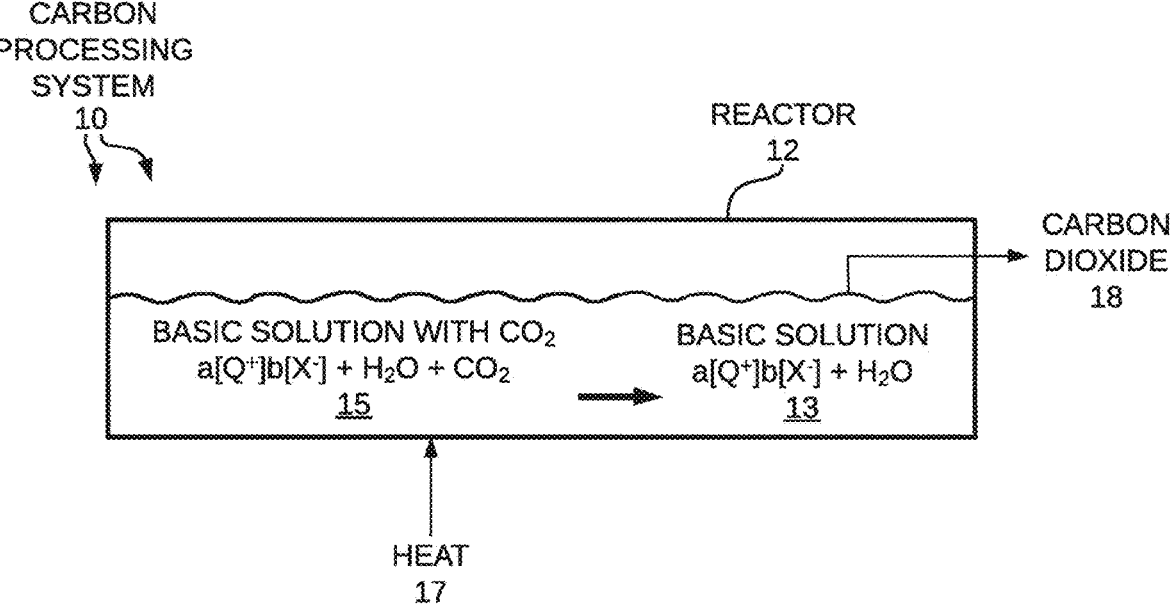
FIG. 3 is a diagram showing the second stage of the multi-stage reactor 12 of the carbon processing system 10.

FIG. 3 is a diagram showing the second stage of the multi-stage reactor 12 of the carbon processing system 10. In the second stage, a desorption reaction is performed in which heat 17 is applied to the base solution with carbon dioxide 15 thereby generating carbon dioxide 18 and generating a base solution without carbon dioxide 13. The base solution without carbon dioxide 13 is reusable by the reactor 12 in processing carbon.

Figure 4:
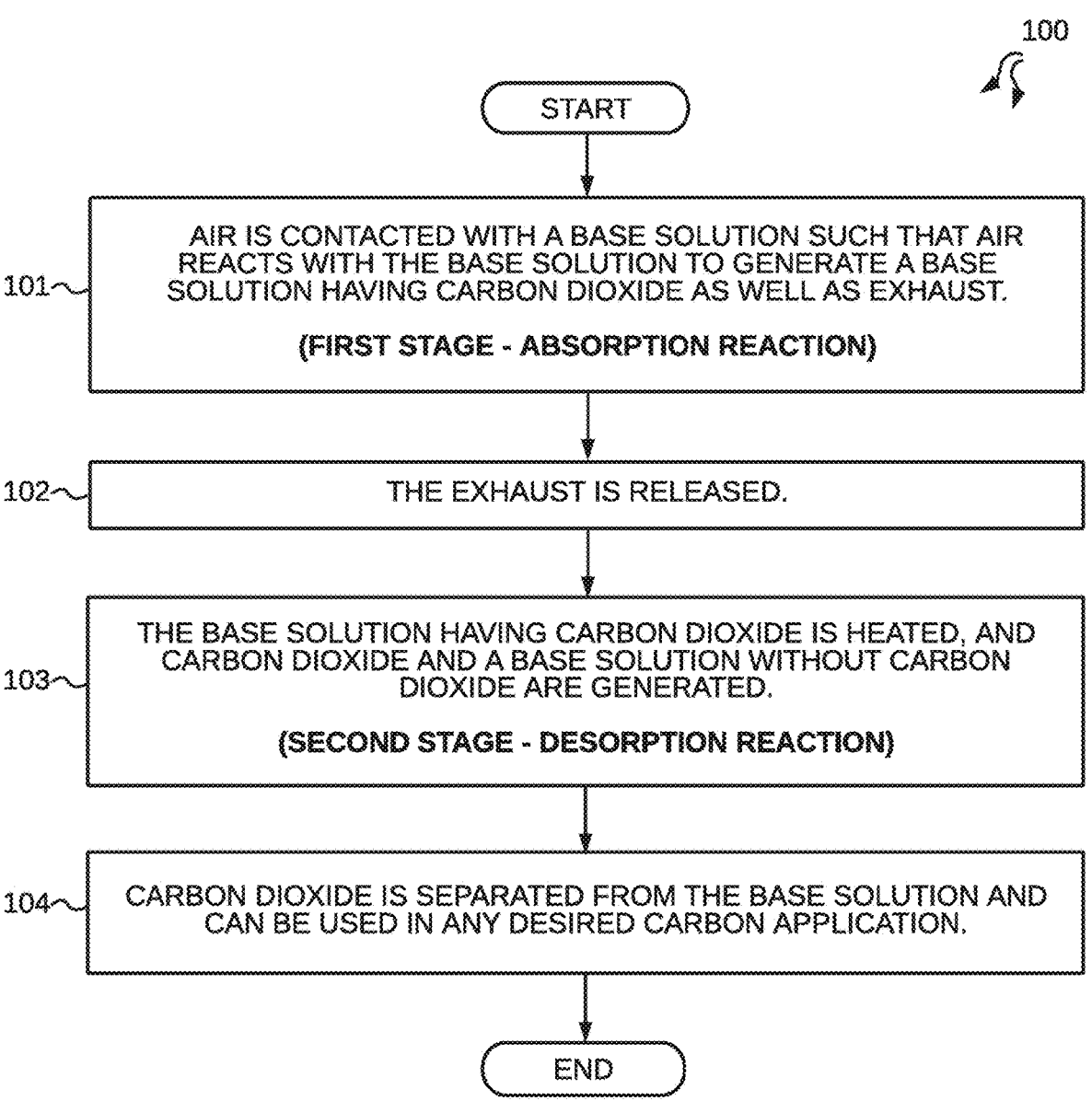
FIG. 4 is a flowchart of a method 100 in accordance with one embodiment.

FIG. 4 is a flowchart of a method 100 in accordance with one embodiment. In a first step (step 101), air contacts a base solution such that the air reacts with the base solution to generate a base solution having carbon dioxide as well as exhaust. This is an absorption reaction. In a second step (step 102), the exhaust is released. In a third step (step 103), the base solution having carbon dioxide is heated thereby generating carbon dioxide as well as a base solution without carbon dioxide. This is a desorption reaction. In a fourth step (step 104), carbon dioxide is separated from the base solution and can be used in any desired carbon application.

Figure 5:
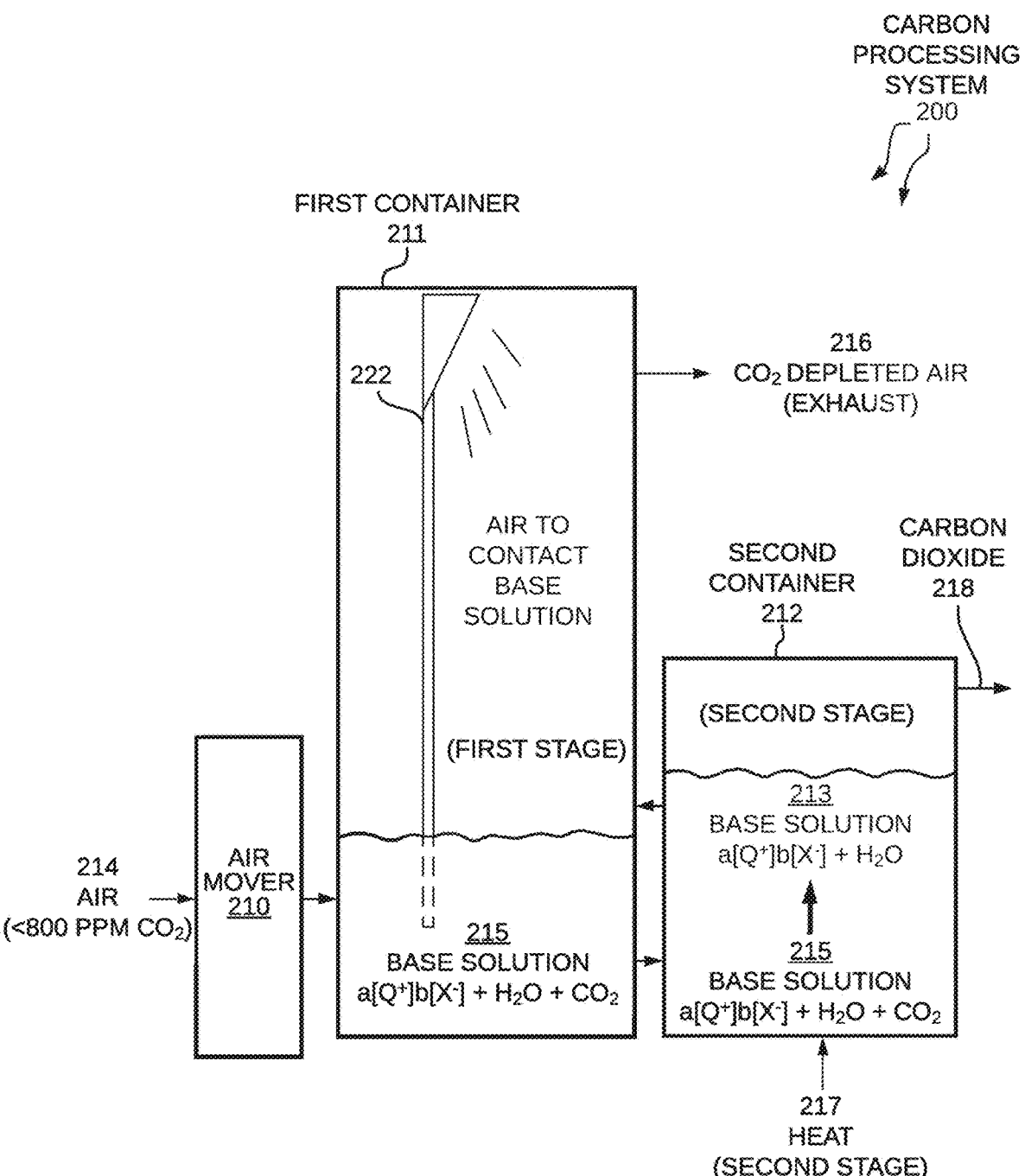
FIG. 5 is a diagram of a carbon processing system 200 in accordance with another embodiment.

FIG. 5 is a diagram of a carbon processing system 200 in accordance with another embodiment. The carbon processing system 200 is similar to carbon processing system 10, except that the first stage and second stage are performed in separate containers. The carbon processing system 200 comprises an air mover 210, a first container 211, and a second container 212. In various embodiments, the air mover 210 comprises at least one of a compressor, a blower, a fan, a turbofan, a pump, a diaphragm pump, an HVAC system, an air contactor, a cooling tower, a falling-film evaporator, or an absorber. In the example shown in FIG. 5, the multi-stage reactor comprises the first container 211 and second container 212. In another example, the multi-stage reactor comprises a single container. In yet another example, the multi-stage reactor comprises more than two containers.

In the example shown FIG. 5, the first container 211 is partially filled with a base solution. The base solution is water ($H_2O$) containing a dissolved salt of the form $a[Q^+]b[X^-]$. The symbol "Q" in this general equation is the cation species, and in one example, is a quaternary ammonium cation taken from the group consisting of $NH_4^+$, $N(CH_3)_4^+$, $N(ethyl)_4^+$, $N(Butyl)_4^+$, and $N(Propyl)_4^+$, or is a cation taken from the group consisting of $K^+$, $Na^+$, $Ca^{2+}$, and $Mg^{2+}$. The symbol "X" in this general equation is the anion species, and in one example, is taken from the group consisting of $OH^-$, $O_2^-$, $CO_3^{2-}$, $HCO_3^-$, $Cl^-$, $Br^-$, and $I^-$. The symbols "a" and "b" in this general equation are integers such that the total charge of the water containing the dissolved salt is neutral.

In another embodiment, the base solution includes corrosion inhibitors, additives, or promoters. The corrosion inhibitors include vanadium pentoxide or other metallic oxides, and the additives or promoters include MEA (monoethanolamine), DEA (diethanolamine), TEA (triethanolamine), MDEA (methyl diethanolamine), piperazine, glycine, or any material that lowers an activation energy. In another embodiment, the base solution includes a phase transfer catalyst or agent with the structure of the form $c[M^+]d[Y^-]$ that reduces interfacial surface tension and promotes mixing in gas-liquid or gas-liquid-solid systems. The symbol "M" in this general equation is the cation species. The symbol "Y" in this general equation is the anion species. The symbols "c" and "d" in this general equation are integers such that the total charge is neutral.

In operation, air 214 contacts the base solution within the first container 211 via the air mover 210 and an air displacer 222. In the example shown in FIG. 5, the air displacer 222 is partially submerged in the base solution. In this example, air displacer 222 is a long tube with a spout or sprinkler head on one end. The air 214 reacts with the base solution thereby generating a base solution having carbon dioxide 215 as well as depleted air (exhaust) 216. This first stage is an absorption reaction. The air 214 that contacts the base solution has less than five percent carbon dioxide by weight. The air 214 that contacts the base solution is not a flue gas. The air 214 that contacts the base solution has a pressure between 0.1 and 10000 psig.

Next, the exhaust 216 is released from the first container 211. The exhaust 216 released has less carbon dioxide than the air that contacts the base solution. The exhaust 216 is carbon dioxide-depleted air.

Next, heat 217 is applied to the base solution having carbon dioxide 215 in second container 212 thereby generating carbon dioxide 218 and generating a base solution without carbon dioxide 213. This second stage is a desorption reaction. Heat 217 increases a temperature of the base solution having carbon dioxide 215 to less than 200 degrees Celsius. In one embodiment, the temperature of the base solution having carbon dioxide 215 is increased to at least 120° C. The base solution without carbon dioxide 213 generated after applying heat 217 is reusable in processing new air 214.

In accordance with at least one novel aspect, the absorption reaction and desorption reaction are reversible reactions resulting in regeneration of the base solution 213 into its form prior to contact with the air. By employing this novel technique, the carbon processing system 200 is highly scalable and consumes less processing volume as is required by many conventional carbon processing techniques.

Figure 6:
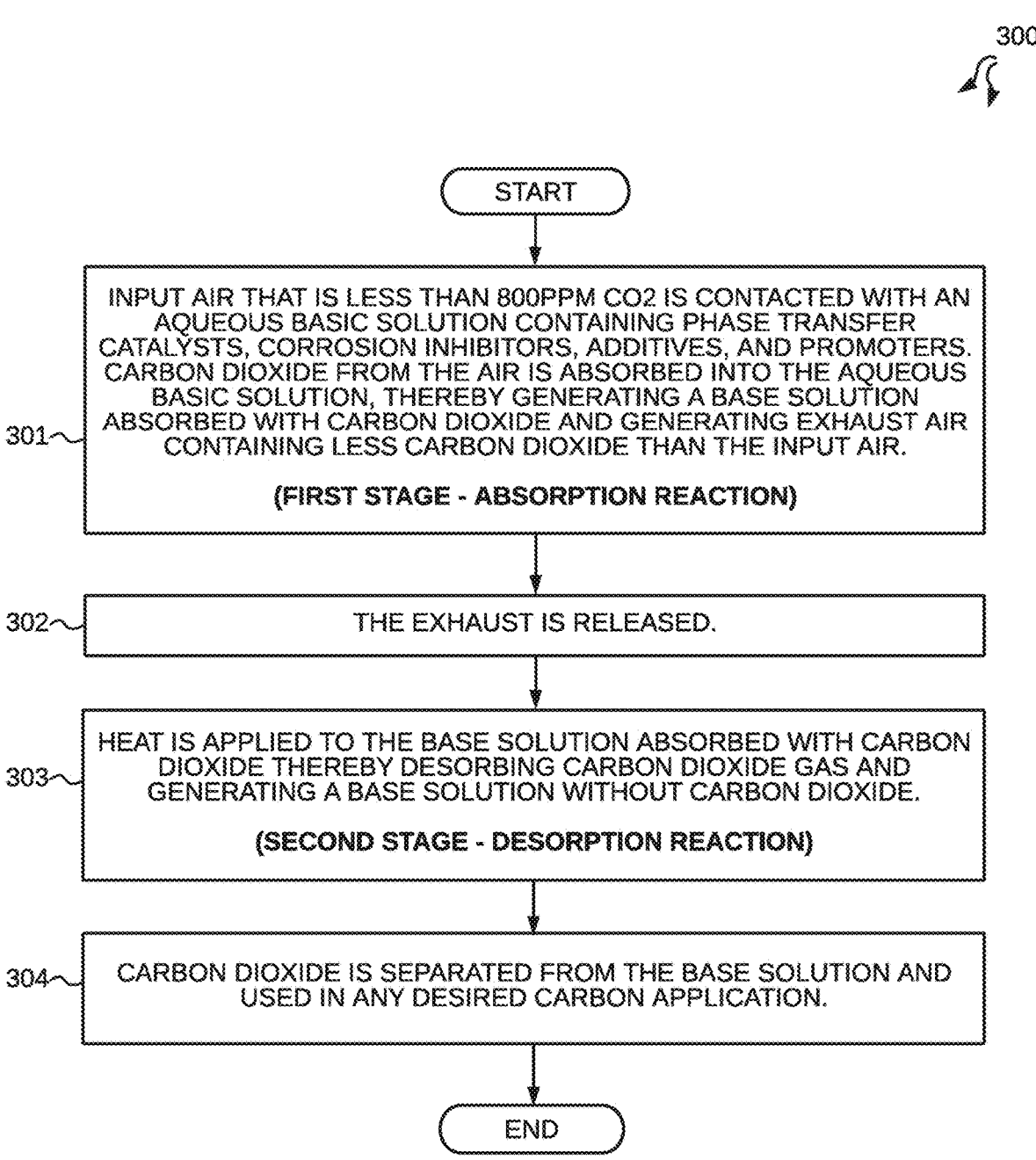
FIG. 6 is a flowchart of a method 300 in accordance with another embodiment.

FIG. 6 is a flowchart of a method 300 in accordance with another embodiment. In a first step (step 301), input air that is less than 800 ppm $CO_2$ is contacted with an aqueous basic solution containing phase transfer catalysts, corrosion inhibitors, additives, and promoters. Carbon dioxide from the air is absorbed into the aqueous basic solution, thereby generating a base solution absorbed with carbon dioxide and generating exhaust air containing less carbon dioxide than the input air. In a second step (step 302), exhaust is released. In a third step (step 303), heat is applied to the base solution absorbed with carbon dioxide thereby desorbing carbon dioxide gas and generating a base solution without carbon dioxide. In a fourth step (step 304), carbon dioxide is separated from the base solution and used in any desired carbon application.

FIG. 7 is a flowchart of a method 400 in accordance with another embodiment. In a first step (step 401), air having less than 800 ppm $CO_2$ contacts a base solution containing phase transfer catalysts, corrosion inhibitors, additives, or promoters, wherein acidic gas $CO_2$ is absorbed into the base solution thereby generating a base-$CO_2$ complex and generating exhaust $CO_2$-reduced air. The base solution is of the form $a[Q^+]b[X^-]$, where Q is the cation species, X is the anion species, and a and b are integers such that the total charge is neutral. The phase transfer catalysts are of the form $c[M^+]d[Y^-]$, where M is the cation species, Y is the anion species, and c and d are integers such that the total charge is neutral.

In a second step (step 402), heat is applied to the base solution producing carbon dioxide and regenerating the base solution into its form prior to contact with the air. In a third step (step 403), carbon dioxide is separated from the base solution and used in any desired carbon application.

Various specific embodiments of the novel carbon processing systems and techniques are discussed below. It is appreciated that other embodiments exist that are within the scope of the claims.

Embodiment #1

One kg-mole of $Q^+X^-$ ($Q^+$ is $2K^+$ or $2Na^+$ and $X^-$ is $CO_3^{2-}$ or $2OH^-$) base was mixed with water to make an aqueous solution with a concentration anywhere between 1%-110% by weight, more specifically between 20-80% by wt, and more precisely between 40-60% by weight. 0.1-5 wt % of a phase transfer catalyst of the general formula of $M^+Y^-$ was added into the solution. One Kg-mole of pure $CO_2$ (95-99-99.9% purity) was brought in contact with the aqueous solution in an autoclave under stirring at a temperature between 5° C. and 200° C., more specifically between 10° C. to 110° C., and more precisely between 10° C. to 80° C. When most of the $CO_2$ was absorbed by the solution, the overhead pressure was released. The steam-jacketed autoclave was then heated to between 80 and 200° C., more specifically between 100-160° C., and more precisely between 110-150° C. to desorb $CO_2$. The autoclave was then cooled down to room temperature and the overhead pure $CO_2$ was bottled for injection. The conversion was around 75-99% and the selectivity was around 99%.

Embodiment #2

One kg-mole of $Q^+X^-$ ($Q^+$ is $2K^+$ or $2Na^+$ and $X^-$ is $CO_3^{2-}$ or $2OH^-$) base was mixed with water to make an aqueous solution with a concentration anywhere between 1%-110% by weight, more specifically between 20-80% by wt, and more precisely between 40-60% by weight. 0.1-5 wt % of a phase transfer catalyst of the general formula of $M^+Y^-$ was added into the solution. One Kg-mole of pure $CO_2$ (95-99-99.9% purity) was brought in contact with the aqueous solution in an autoclave under stirring at a temperature between 5° C. and 200° C., more specifically between 10° C. to 110° C., and more precisely between 10° C. to 80° C. When most of the $CO_2$ was absorbed by the solution, the overhead pressure was released. The steam-jacketed autoclave was then heated to between 80 and 200° C., more specifically between 100-160° C., and more precisely between 110-150° C. to desorb $CO_2$. The autoclave was then cooled down to room temperature and the overhead pure $CO_2$ was bottled for injection. The conversion was around 75-99% and the selectivity was around 99%.

Embodiment #3

One kg-mole of $Q^+X^-$ ($Q^+$ is $N(CH_3)_4^+$ and $X^-$ is OH) base was mixed with water to make an aqueous solution with a concentration anywhere between 1%-110% by weight, more specifically between 10-80% by wt, and more precisely between 25-60% by weight. 0.1-5 wt % of a phase transfer catalyst of the general formula of $M^+Y^-$ was added into the solution. One Kg-mole of pure $CO_2$ (95-99-99.9% purity) was brought in contact with the aqueous solution in an autoclave at a temperature between 0° C. and 120° C., more specifically between 5° C. to 75° C., and more precisely between 10° C. to 55° C. When most of the $CO_2$ was absorbed by the solution, the overhead pressure was released. The steam-jacketed autoclave was then heated to between 50 and 110° C., more specifically between 60-80° C., and more precisely between 65-75° C. to desorb $CO_2$. The autoclave was then cooled down to room temperature and the overhead pure $CO_2$ was bottled for injection. The conversion was around 85-99% and the selectivity was around 98%.

Embodiment #4

Embodiment #1 was run with Air (approximately 400 ppm $CO_2$) bubbling through liquid solution and resulted in 75-80% conversion of $CO_2$ in the feed gas (Air) with 99% selectivity.

Embodiment #5

Embodiment #2 was run with Air (approximately 400 ppm $CO_2$) bubbling through liquid solution and resulted in 75-90% conversion of $CO_2$ in the feed gas (Air) with 98% selectivity.

Embodiment #6

One kg-mole of $Q^+X^-$ ($Q^+$ is $NH_4^+$ and $X^-$ is $OH^-$) base was mixed with water to make an aqueous solution with a concentration anywhere between 1%-110% by weight, more specifically between 20-80% by wt, and more precisely between 35-60% by weight. One Kg-mole of pure $CO_2$ (95-99-99.9% purity) was brought in contact with the aqueous solution in an autoclave at a temperature between 0° C. and 120° C., more specifically between 10° C. to 55° C., and more precisely between 15° C. to 45° C. When most of the $CO_2$ was absorbed by the solution, the overhead pressure was released. The steam-jacketed autoclave was then heated to between 50 and 200° C., more specifically between 55-110° C., and more precisely between 60-105° C. to desorb $CO_2$. The autoclave was then cooled down to room temperature, the overhead gas mixture was bubbled through water, and purified $CO_2$ was bottled for injection. The conversion was around 65-99% and the selectivity was around 97%.

Embodiment #7

One kg-mole of $Q^+X^-$ ($Q^+$ is $N(Butyl)_4^+$ and $X^-$ is $OH^-$) base was mixed with water to make an aqueous solution with a concentration anywhere between 1%-110% by weight, more specifically between 10-80% by wt, and more precisely between 25-60% by weight. One Kg-mole of pure $CO_2$ (95-99-99.9% purity) was brought in contact with the aqueous solution in an autoclave at a temperature between 0° C. and 120° C., more specifically between 5° C. to 85° C., and more precisely between 10° C. to 65° C. When most of the $CO_2$ was absorbed by the solution, the overhead pressure was released. The steam-jacketed autoclave was then heated to between 50 and 180° C., more specifically between 60-150° C., and more precisely between 65-125° C. to desorb $CO_2$. The autoclave was then cooled down to room temperature and the overhead pure $CO_2$ was bottled for injection. The conversion was around 83-97% and the selectivity was around 98%.

Embodiment #8

Step 1: One kg-mole of $Q^+X^-$ ($Q^+$ is $K^+$ or $Na^+$ and $X^-$ is $OH^-$) base was mixed with water to make an aqueous solution with a concentration anywhere between 1%-110% by weight, more specifically between 20-80% by wt, and more precisely between 40-60% by weight. 0.1-5 wt % of a phase transfer catalyst of the general formula of $M^+Y^-$ was added into the solution. One Kg-mole of pure $CO_2$ (95-99-99.9% purity) was brought in contact with the aqueous solution in an autoclave under stirring at a temperature between 5° C. and 200° C., more specifically between 10° C. to 110° C., and more precisely between 10° C. to 80° C. When most of the $CO_2$ was absorbed by the solution, the overhead pressure was released. The solution was analyzed for carbonates.

Step 2: The autoclave was then recharged with another Kg-mole of pure $CO_2$ (93-99-99.9% purity), and was brought in contact with the aqueous solution in an autoclave under stirring at a temperature between 5° C. and 200° C., more specifically between 10° C. to 110° C., and more precisely between 10 C to 80 C. When most of the $CO_2$ was absorbed by the solution, the overhead pressure was released. The solution was analyzed for bicarbonate.

Step 3: The steam-jacketed autoclave was then heated to between 80 and 200° C., more specifically between 100-160° C., and more precisely between 110-150° C. to desorb $CO_2$. The autoclave was then cooled down to room temperature and the overhead pure $CO_2$ was bottled for injection. The conversion was around 75-99% and the selectivity was around 99%. The total output for $CO_2$ was almost twice the Kg-mole of starting $Q^+X^-$.

Embodiment #9

Embodiment #9 was run exactly the same way as Embodiment #8, except Air was bubbled through for the entirety of the first two stages of transformation. Conversion was around 75-99% and the selectivity was around 99%. The total output for $CO_2$ was almost twice the Kg-mole of starting $Q^+X^-$.

Embodiment #10

Step 1: One kg-mole of $Q^+X^-$ ($Q^+$ is $K^+$ or $Na^+$ and $X^-$ is $OH^-$) base was mixed with water to make an aqueous solution with a concentration anywhere between 1%-110% by weight, more specifically between 20-80% by wt, and more precisely between 40-60% by weight. 0.1-5 wt % of a phase transfer catalyst of the general formula of $M^+Y^-$ was added into the solution.

One Kg-mole of pure $CO_2$ (95-99-99.9% purity) was brought in contact with the aqueous solution in an autoclave under stirring at a temperature between 5° C. and 200° C., more specifically between 10° C. to 110° C., and more precisely between 10° C. to 80° C. When most of the $CO_2$ was absorbed by the solution, the overhead pressure was released. The solution was analyzed for carbonates.

Step 2: The autoclave was then recharged with another Kg-mole of pure $CO_2$ (93-99-99.9% purity), and was brought in contact with the aqueous solution in an autoclave under stirring at a temperature between 5° C. and 200° C., more specifically between 10° C. to 110° C., more precisely between 10° C. to 80° C. When most of the $CO_2$ was absorbed by the solution, the overhead pressure was released. The solution was analyzed for bicarbonate.

Step 3: The steam-jacketed autoclave was then heated to between 80 and 200° C., more specifically between 100-160° C., and more precisely between 110-150° C. to desorb $CO_2$. The autoclave was then cooled down to room temperature and the overhead pure $CO_2$ was bottled for injection. The conversion was around 75-99% and the selectivity was around 99%. The total output for $CO_2$ was almost twice the Kg-mole of starting $Q^+X^-$.

Embodiment #11

Embodiment #11 was run exactly as Embodiment #10, except Air was bubbled through for the entirety of the first two stages of transformation. Conversion was around 75-99% and the selectivity was around 99%. The total output for $CO_2$ was almost twice the Kg-mole of starting $Q^+X^-$.

Embodiment #12

One kg-mole of $Q^+X^-$ ($Q^+$ is $2K^+$ or $2Na^+$ and $X^-$ is $CO_3^{2-}$ or $OH^-$) base was mixed with water to make an aqueous solution with a concentration anywhere between 1%-110% by weight, more specifically between 20-80% by wt, and more precisely between 40-60% by weight. 0.1-5 wt % of a phase transfer catalyst of the general formula of $M^+Y^-$ was added into the solution. Also added was 0.5-1 wt % of any activation promoters & additives such as MEA, TEA, DEA, MDEA, piperazine, 1-glycine was used to lower the activation energy. One Kg-mole of pure $CO_2$ (95-99-99.9% purity) was brought in contact with the aqueous solution in an autoclave under stirring at a temperature between 5° C. and 200° C., more specifically between 10° C. to 110° C., and more precisely between 10° C. to 80° C. When most of the $CO_2$ was absorbed by the solution, the overhead pressure was released. The steam-jacketed autoclave was then heated to between 80 and 200° C., more specifically between 100-160° C., and more precisely between 110-150° C. to desorb $CO_2$. The autoclave was then cooled down to room temperature and the overhead pure $CO_2$ was bottled for injection. The conversion was around 75-99% and the selectivity was around 99%.

Embodiment #13

Embodiment #13 operated similarly to embodiment #12 but with Air. Conversion was around 65-99% and the selectivity was around 99%. The total output for $CO_2$ was almost twice the Kg-mole of starting $Q^+X^-$.

Embodiment #14

One kg-mole of $Q^+X^-$ ($Q^+$ is $2K^+$ or $2Na^+$ and $X^-$ is $CO_3^{2-}$ or $OH^-$) base was mixed with water to make an aqueous solution with a concentration anywhere between 1%-110% by weight, more specifically between 20-80% by wt, and more precisely between 40-60% by weight. 0.1-5 wt % of a phase transfer catalyst of the general formula of $M^+Y^-$ was added into the solution. Also added was 0.5-20 wt % of activation promoters and additives such as MEA, TEA, DEA, MDEA to get higher $CO_2$ capture kinetics. One Kg-mole of pure $CO_2$ (95-99-99.9% purity) was brought in contact with the aqueous solution in an autoclave under stirring at a temperature between 5° C. and 200° C., more specifically between 10° C. to 110° C., and more precisely between 10° C. to 80° C. When most of the $CO_2$ was absorbed by the solution, the overhead pressure was released. The steam-jacketed autoclave was then heated to between 80 and 200° C., more specifically between 100-160° C., and more precisely between 110-150° C. to desorb $CO_2$. The autoclave was then cooled down to room temperature and the overhead pure $CO_2$ was bottled for injection. The conversion was around 95-99% and the selectivity was around 99%.

Embodiment #15

Embodiment #15 operated similarly to Embodiment #14 but with Air. Conversion was around 95-99% and the selectivity was around 99%.

Embodiment #16

One kg-mole of $Q^+X^-$ ($Q^+$ is $2K^+$ or $2Na^+$ and $X^-$ is $CO_3^{2-}$ or $OH^-$) base was mixed with water to make an aqueous solution with a concentration anywhere between 1%-110% by weight, more specifically between 20-80% by wt, and more precisely between 40-60% by weight. 0.1-5 wt % of a phase transfer catalyst of the general formula of $M^+Y^-$ was added into the solution. 1 wt % of $V_2O_5$ was added as a corrosion inhibitor to control the Redox Potential of the solution so that iron oxides are preferentially stabilized rather than iron carbonates. One Kg-mole of pure $CO_2$ (95-99-99.9% purity) was brought in contact with the aqueous solution in an autoclave under stirring at a temperature between 5° C. and 200° C., more specifically between 10° C. to 110° C., and more precisely between 10° C. to 80° C. When most of the $CO_2$ was absorbed by the solution, the overhead pressure was released. The steam-jacketed autoclave is then heated to between 80 and 200° C., more specifically between 100-160° C., more precisely between 110-150° C. to desorb $CO_2$. The autoclave was cooled down to room temperature and the overhead pure $CO_2$ was bottled for injection. The conversion was around 75-99% and the selectivity was around 99%.

Embodiment #17

Embodiment #17 operated similarly to Embodiment #16 but with Air. Conversion was around 95-99% and the selectivity was around 99%.

Embodiment #18

One kg-mole of $Q^+X^-$ ($Q^+$ is $2K^+$ or $2Na^+$ and $X^-$ is $CO_3^{2-}$ or $OH^-$) base was mixed with water to make an aqueous solution with a concentration anywhere between 1%-110% by weight, more specifically between 20-80% by wt, and more precisely between 40-60% by weight. 0.1-5 wt % of a phase transfer catalyst of the general formula of $M^+Y^-$ was added into the solution. 1 wt % of $V_2O_5$ was added as a corrosion inhibitor to control the Redox Potential of the solution so that iron oxides are preferentially stabilized rather than iron carbonates. One Kg-mole of pure $CO_2$ (95-99-99.9% purity) was brought in contact with the aqueous solution in an autoclave under stirring at a temperature between 5° C. and 200° C., more specifically between 10° C. to 110° C., and more precisely between 10° C. to 80° C. When most of the $CO_2$ was absorbed by the solution, the overhead pressure was released. The steam-jacketed autoclave was then heated to between 80 and 200° C., more specifically between 100-160° C., and more precisely between 110-150° C. to desorb $CO_2$. The autoclave was cooled down to room temperature and the overhead pure $CO_2$ was bottled for injection. The conversion was around 75-99% and the selectivity was around 99%. The $CO_2$ was further purified by passing it through a Y-Zeolite column and an amine absorber for the usage as a mobile and industrial refrigerant in supercritical $CO_2$ state.

Embodiment #19

Embodiment #19 operated similarly to Embodiment #18 but with air. Conversion was around 75-99% and the selectivity was around 99%.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A carbon dioxide processing method comprising:
by operation of an air mover, moving ambient air into a multi-stage reactor comprising a container, wherein the ambient air contacts a base solution in the container;
removing carbon dioxide ($CO_2$) gas from the ambient air in the container, wherein the base solution removes the $CO_2$ gas from the ambient air to form an exhaust gas in the container;
releasing the exhaust gas from the container; and
heating the base solution to release the $CO_2$ gas from the base solution.

2. The method of claim 1, wherein the container comprises a single container that contains the base solution during:
a first stage of a carbon dioxide removing process, when the $CO_2$ gas is removed from the ambient air; and
a second stage of the carbon dioxide removing process, when the $CO_2$ gas is removed from the base solution.

3. The method of claim 1, wherein:
the container comprises a first container that contains the base solution during a first stage of a carbon dioxide removing process;
the multi-stage reactor comprises a second, distinct container, and
heating the base solution to release the $CO_2$ gas from the base solution comprises heating the base solution in the second container to release the $CO_2$ gas from the base solution during a second stage of the carbon dioxide removing process.

4. The method of claim 1, wherein moving the ambient air into the multi-stage reactor comprises:
bubbling the ambient air through the base solution in the container.

5. The method of claim 1, wherein the base solution is water containing a dissolved salt of the form $a[Q^+]b[X^-]$, Q is the cation species, X is the anion species, a and b are integers such that the total charge of the water containing the dissolved salt is neutral.

6. The method of claim 5, wherein the base solution comprises:
a phase transfer catalyst, and
a promoter.

7. The method of claim 1, wherein the air mover is configured to move the ambient air into the container at a pressure in a range of 0.1 to 10,000 pounds per square inch gauge (psig).

8. The method of claim 1, wherein the container comprises an air displacer partially submerged in the base solution in the container, and moving the ambient air into the container comprises:
moving the ambient air into the container through the air displacer.

9. The method of claim 1, wherein the air mover comprises a fan, and moving the ambient air into the container comprises:
moving the ambient air into the container by operation of the fan.

10. A carbon dioxide processing system comprising:
a multi-stage reactor comprising a container, the container comprising a base solution;
an air mover configured to move ambient air into the container, wherein the base solution is configured to remove carbon dioxide ($CO_2$) gas from the ambient air to form an exhaust gas in the container; and
a heat source configured to heat the base solution to remove the $CO_2$ gas from the base solution.

11. The system of claim 10, wherein the container comprises a single container that contains the base solution during:
a first stage of a carbon dioxide removing process, when the $CO_2$ gas is removed from the ambient air; and
a second stage of the carbon dioxide removing process, when the $CO_2$ gas is removed from the base solution.

12. The system of claim 10, wherein:
the container comprises a first container that contains the base solution during a first stage of a carbon dioxide removing process, when the $CO_2$ gas is removed from the ambient air; and
the multi-stage reactor comprises a second, distinct container that contains the base solution during a second stage of the carbon dioxide removing process, when the $CO_2$ gas is removed from the base solution.

13. The system of claim 10, wherein the base solution is water containing a dissolved salt of the form $a[Q^+]b[X^-]$, Q is the cation species, X is the anion species, a and b are integers such that the total charge of the water containing the dissolved salt is neutral.

14. The system of claim 13, wherein the base solution comprises:
a phase transfer catalyst, and
a promoter.

15. The system of claim 10, wherein the air mover is configured to move the ambient air into the container at a pressure in a range of 0.1 to 10,000 psig.

16. The system of claim 10, wherein the multi-stage reactor comprises an air displacer partially submerged in the base solution in the container, and the air mover is configured to move the ambient air into the container through the air displacer.

17. The system of claim 10, wherein the air mover comprises a fan.

18. The system of claim 10, wherein the air mover is configured to bubble the ambient air through the base solution in the container.

\* \* \* \* \*